United States Patent
La Porta et al.

(10) Patent No.: US 9,002,157 B2
(45) Date of Patent: Apr. 7, 2015

(54) METHOD OF MANUFACTURING A THREE DIMENSIONAL PHOTONIC DEVICE BY TWO PHOTON ABSORPTION POLYMERIZATION

(71) Applicant: International Business Machines Corporation, Armonk, NY (US)

(72) Inventors: Antonio La Porta, Zurich (CH); Bert J Offrein, Zurich (CH); Ibrahim Murat Soganci, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 13/898,869

(22) Filed: May 21, 2013

(65) Prior Publication Data

US 2013/0315530 A1   Nov. 28, 2013

(30) Foreign Application Priority Data

May 24, 2012   (GB) .................................. 1209083.3

(51) Int. Cl.
*G02B 6/12* (2006.01)
*G02B 6/138* (2006.01)

(52) U.S. Cl.
CPC ...................................... *G02B 6/138* (2013.01)

(58) Field of Classification Search
CPC .................................. G02B 6/138; G02B 6/12
USPC ...................................................... 385/14, 33
See application file for complete search history.

(56) References Cited

U.S. PATENT DOCUMENTS

| | | | |
|---|---|---|---|
| 7,092,602 B2 | 8/2006 | Park et al. | |
| 2003/0215187 A1 | 11/2003 | Tidmarsh et al. | |
| 2004/0190818 A1* | 9/2004 | Telkamp et al. | 385/22 |
| 2007/0116409 A1 | 5/2007 | Bryan et al. | |
| 2009/0218519 A1 | 9/2009 | McLeod | |
| 2010/0142896 A1* | 6/2010 | Riester et al. | 385/88 |

OTHER PUBLICATIONS

L. Y. Lin et al., IEEE Photon. Technol. Lett. 6. 1445-1447 (1994).
F. E. Doany et al., IEEE Trans. Adv. Packag. 32, 345-359 (2009).
A. L. Glebov et al., IEEE Photon. Technol. Lett. 17, 1540-1542 (2005).
C. Choi et al., J. Lightwave Technol. 22, 2168-2176 (2004).
M. Kagami et al., J. Lightwave Technol. 19, 1949-1955 (2001).
T. Yoshimura et al., J. Lightwave Technol. 22, 2091-2100 (2004).
N. Lindenmann et al., Optical Fiber Communication Conference, 2011, Paper PDPC1.
Barker et al., "Waveguides Fabrication by Two-Photon Absorption Polymerization," Harvard REU 2005.

* cited by examiner

*Primary Examiner* — Ryan Lepisto
(74) *Attorney, Agent, or Firm* — Jeff Tang

(57) ABSTRACT

A method of manufacturing a three dimensional photonic device by two photon absorption polymerization. The method includes several stages, including direct laser writing involving polymerization by two-photon absorption to manufacture a three dimensional photonic device integrating at least two distinct micro-optical components having two optical functions and being aligned with each other so that optical signal can be transmitted from one of said distinct components to the other. The distinct components are built at a same stage of the process flow to improve their relative alignment by direct laser writing involving polymerization by two-photon absorption.

17 Claims, 2 Drawing Sheets

METHOD OF MANUFACTURING A THREE DIMENSIONAL PHOTONIC DEVICE BY TWO PHOTON ABSORPTION POLYMERIZATION

CROSS-REFERENCE TO RELATED APPLICATION

This application claims priority under 35 U.S.C. §119 from United Kingdom (GB) Patent Application No. 1209083.3 filed May 24, 2012, the entire contents of which are incorporated herein by reference.

TECHNICAL FIELD

The invention relates to methods of manufacturing a three dimensional photonic device including several distinct micro-optical components, which can be very different from one another, in an efficient and reliable way.

BACKGROUND

When manufacturing a three dimensional photonic device including several distinct micro-optical components, the more different the micro-optical components are from one another, the more difficult it is to integrate them in a single device, in an efficient and reliable way.

The integration of optical waveguides with free-space micro-optical components and micromechanical structures is a major technical problem because high positioning accuracy, cost efficiency, high yield and reliability have to be achieved. The integration scheme should also be compatible with a variety of optical and mechanical designs. A method that matches these conditions can pave the way for on-chip mode engineering, low-loss coupling of optical components with in-plane and out-of-plane components, and accurate alignment for packaging.

Hybrid integration is frequently used in order to package waveguides with lenses, mirrors and alignment structures. The major drawbacks of this approach are the increased cost due to the additional assembly steps and the limited accuracy of positioning.

Monolithic integration can potentially solve these problems. However, there are not any general purpose methods for monolithic integration of the three types of elements, namely guided wave photonic devices, free space micro-optical components and micromechanical structures. Even the application specific monolithic integration methods do not satisfy the stringent requirements mentioned above.

According to a first prior art, for example described in application US 2007/0116409A1, gradient-index (GRIN) lenses consisting of multiple layers that form a special distribution of refractive index, can be integrated with planar waveguides. However, fabrication of GRIN lenses is demanding due to the necessity of several layers with well-controlled refractive indices.

According to a second prior art, for example described in article which reference is "L. Y. Lin et al., IEEE Photon. Technol. Lett. 6. 1445-1447 (1994)", three dimensional integrated micro-lenses can be fabricated using silicon micromachining, but this technique is compatible with only silicon-based material systems.

According to a third prior art, for example described in an article which reference is "F. E. Doany et al., IEEE Trans. Adv. Packag. 32, 345-359 (2009)", or in article which reference is "A. L. Glebov et al., IEEE Photon. Technol. Lett. 17, 1540-1542 (2005)", or in article which reference is "C. Choi et al., J. Lightwave Technol. 22, 2168-2176 (2004)", or in article which reference is "M. Kagami et al., J. Lightwave Technol. 19, 1949-1955 (2001)", or in article which reference is "T. Yoshimura et al., J. Lightwave Technol. 22, 2091-2100 (2004)", several methods including laser ablation, dicing, blade cutting, reactive ion etching, and tilted exposure have been used to fabricate out-of-plane mirrors in polymer waveguides. However, these methods are limited to the fabrication of tilted plane mirrors.

According to a fourth prior art, for example described in application U.S. Pat. No. 7,092,602 B2 or in application US 2003/0215187 A1, grooves on the substrate for alignment of fibers with waveguides are reported. However, fabrication of grooves with micron-scale accuracy is not possible for some substrate materials.

According to a fifth prior art, for example described in application US 2009/0218519 A1, refractive index change based on two-photon absorption has also been proposed as a method to fabricate optical devices. However, only limited optical functionality can be achieved with this method because of the low refractive index contrast.

According to a sixth prior art, for example described in application US 2010/0142896 A1 or in article which reference is "N. Lindenmann et al., Optical Fiber Communication Conference, 2011, Paper PDPC1" or in document which can be found at following internet address "http://www.eduprograms.seas.harvard.edu/reu05_papers/Barker_Krystal.pdf>>, there are other manufacturing methods using two photon absorption. But this prior art mounts components and connects them afterwards by direct laser writing the waveguides between these components.

According to a seventh prior art, for example described in article which reference is "Q.-D. Chen et al., CLEO/Pacific Rim Conference, 2009, 1-2," there are methods of manufacturing individual optical elements, such as Fresnel lenses using two photon absorption. But, if the use of two-photon absorption for the fabrication of optical elements on polymers is known in itself, none of the previously cited prior art documents provides a solution based on two-photon absorption for building complex optical three dimensional structures, in an efficient and reliable way.

SUMMARY OF THE INVENTION

Accordingly, one aspect of the present invention provides a method for manufacturing a three dimensional photonic device that includes several manufacturing stages, the method including: fabricating at least two distinct micro-optical components by direct laser writing involving polymerization by two-photon absorption at a same manufacturing stage of the process flow; wherein at least two distinct micro-optical components are integrated within the three dimensional photonic device; have respective optical functions; and are aligned with each other, such that optical signal can be transmitted from one of the distinct components to another one of the distinct components.

Another aspect of the present invention deals with a method for manufacturing, within a process flow including several stages, including direct laser writing involving polymerization by two-photon absorption, a three dimensional photonic device integrating at least two distinct micro-optical components having respectively two optical functions and being aligned with each other so that optical signal can be transmitted from one of the distinct components to the other, wherein the distinct components are built, at a same stage of the process flow in order to improve their relative alignment, by the direct laser writing involving polymerization by two-photon absorption.

Another aspect the present invention deals with a method for manufacturing, by direct laser writing involving polymerization by two-photon absorption, at least one micro-optical component, being preferably a guided wave micro-optical component, being integrated in a three dimensional photonic device and presenting a concave shape along the direction of the thickness of the three dimensional photonic device.

Another aspect of the present invention deals with a three dimensional photonic device integrating at least two distinct micro-optical components having respectively two optical functions and being aligned with each other so that optical signal can be transmitted from one of the components to the other, wherein the distinct components are embedded in a same monolithic structure manufactured by direct laser writing involving polymerization by two-photon absorption.

Another aspect of the present invention deals with a three dimensional photonic device integrating at least one micro-optical component presenting a concave shape along the direction of the thickness of the three dimensional photonic device, wherein the component has been manufactured by direct laser writing involving polymerization by two-photon absorption.

All features previously presented in some embodiments can be combined together, all together or only part of them, and can be associated with any aspect, first aspect to fourth aspect, of an embodiment of the invention. Further features and advantages of the invention will appear from the following description of embodiments of the invention, given as non-limiting examples, with reference to the accompanying drawings listed hereunder.

DETAILED DESCRIPTION OF THE INVENTION

Figure 1:
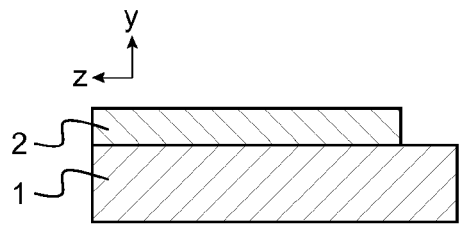
FIG. 1 shows a non limitative example of an embodiment of the invention showing a first step of a manufacturing method of a three dimensional photonic device involving polymerization by two-photon absorption.

Some embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, these embodiments are provided for the thorough and complete understanding of the present disclosure, and completely conveying the scope of the present disclosure to those skilled in the art.

In some embodiments, at least one of the distinct components presents a concave shape along the direction of the thickness of the three dimensional guided wave photonic device.

In some embodiments, the manufacturing is performed by hybrid direct laser writing including a first beam to perform the direct laser writing involving polymerization by two-photon absorption, to build three dimensional components, and a second beam, distinct from the first beam, to perform another direct laser writing involving polymerization by one-photon absorption, to build two dimensional components, both the beams being adapted to be used alternatively.

In some embodiments, light of the direct laser writing involving polymerization by two-photon absorption ranges in the visible and/or the infrared, and wherein light of the direct laser writing involving polymerization by one-photon absorption ranges in the ultraviolet.

In some embodiments, at least one of the distinct components is a passive waveguide adapted to merely transmit an optical signal between from or to another of the distinct components.

In some embodiments, the passive waveguide is adapted to merely transmit an optical signal between two others of the distinct components.

In some embodiments, the three dimensional photonic device comprises at least one passive waveguide which is adapted to merely transmit an optical signal from or to another of the distinct components and which has been manufactured by mask exposure based photolithography.

In some embodiments, at least one of the distinct components is a micro-lens, a mirror, a multiplexer, a coupler, a splitter, a polarization controller, an amplifier, a detector, a pyramid, or a pit.

In some embodiments, the three dimensional photonic device integrates at least a guided wave micro-optical component and at least a free space micro-optical component and at least a micromechanical structure.

In some embodiments, the method for manufacturing includes, preferably successively: depositing film(s) on a substrate; the direct laser writing involving polymerization by two-photon absorption and preferably alternative direct laser writing involving polymerization by one-photon absorption; removing unexposed materials.

In some embodiments, the depositing, laser writing and removing, are performed several times to constitute several corresponding layers.

In some embodiments, a computer program product comprising a computer readable medium, having thereon a computer program comprising program instructions, the computer program being loadable into a data-processing unit and adapted to cause execution of the method for manufacturing when the computer program is run by the data-processing unit.

FIGS. 1 to 12 will show the performance of a method of monolithically integrating guided wave micro-optical components, free space micro-optical components and micromechanical structures using a low-cost and time-efficient manufacturing method, as well as part of some three dimensional photonic devices obtained through this manufacturing method, and a hybrid laser apparatus to perform this manufacturing method.

This manufacturing method includes selective and unselective deposition of multiple materials, hybrid direct patterning that employs one-photon and two-photon laser writing, and chemical material removal. Using this manufacturing method can provide advantages as obtaining three-dimensional elements with a broad range of refractive indices and mechanical designs which can be integrated monolithically. Better monolithic integration of the three dimensional photonic device will also lead to lower corresponding packaging cost.

Besides, when using a hybrid laser writing apparatus, the processing speed will not be significantly lower than the processing speed of a conventional planar device manufacturing method. Moreover, all integrated elements are self-aligned to one another without additional assembly steps. This manufacturing method is not only capable of monolithically integrating a significantly broader range of elements compared to the existing methods, but can also offer very high positioning accuracy, cost efficiency, yield, optical and mechanical performance, and insensitivity to the type of substrate used.

FIG. 1 shows a non limitative example of an embodiment of the invention showing a first step of a manufacturing method of a three dimensional photonic device involving polymerization by two-photon absorption. A three axis coordinate system x, y and z, with axis x not represented because perpendicular to the plan of the figure, can be used to reference the three dimensional photonic device, which average plan is parallel to plan xz and which thickness is along direction y. This three axis coordinate system x, y and z is also repeatedly shown on FIGS. 6 and 10. First, there is a deposition, in part, of the lower cladding layers 1 and 2. Those lower cladding layers 1 and 2 are deposited as films of single or multiple materials, using for example inkjet printing, spin coating or doctor blading.

Figure 2:
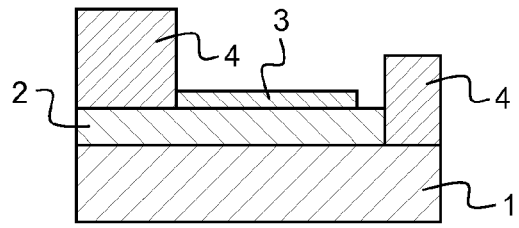
FIG. 2 shows a non limitative example of an embodiment of the invention showing a second step of a manufacturing method of a three dimensional photonic device involving polymerization by two-photon absorption.

FIG. 2 shows a non limitative example of an embodiment of the invention showing a second step of a manufacturing method of a three dimensional photonic device involving polymerization by two-photon absorption. Second, there is a deposition, in part, of the materials that will form the waveguide core and the other micro-optical components, like for example a lens, a mirror and a ball. The material 3 is to be processed by single-photon exposure, whereas the material 4 is to be processed by two-photon exposure. Selective deposition can be implemented if necessary. In this way, materials optimized for one-photon and two-photon patterning and materials with different refractive indices and thicknesses can be deposited either on the same level or on different levels.

Figure 3:
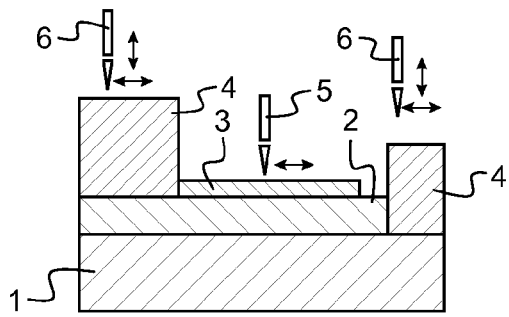
FIG. 3 shows a non limitative example of an embodiment of the invention showing a third step of a manufacturing method of a three dimensional photonic device involving polymerization by two-photon absorption.

FIG. 3 shows a non limitative example of an embodiment of the invention showing a third step of a manufacturing method of a three dimensional photonic device involving polymerization by two-photon absorption. There is a one-photon exposure of the materials 3 which are that way polymerized by a one-photon absorption laser writing beam 5. There is also a two-photon exposure of the materials 4 which are that way polymerized by a two-photon absorption laser writing beam 6. It can be seen that the one-photon absorption laser writing beam 5 can only be moved in the average plan of the photonic device to be manufactured. It can also be seen that the two-photon absorption laser writing beam 6 can not only be moved in the average plan of the photonic device to be manufactured, but also in the thickness of the photonic device to be manufactured.

So, the two-photon absorption laser writing beam 6 offers much wider possibilities as to the complexity of patterning than the one-photon absorption laser writing beam 5. The one-photon absorption laser writing beam 5, in turn, offers a higher manufacturing speed than the two-photon absorption laser writing beam 6. Using both of them adds both advantages, because it allows using the two-photon absorption laser writing beam 6 where complex pattern manufacturing is needed as well as using the one-photon absorption laser writing beam 5 where simpler but quicker pattern manufacturing is needed, in the same manufacturing process of a single three dimensional photonic device with a high monolithic structure integration level. Integrated components and structures, which require high relative positioning accuracy, are patterned by hybrid direct laser writing at the same stage of the process flow. Indeed, structures with three dimensional features are patterned with two-photon absorption laser writing, whereas structures that do not require three-dimensional patterning, for example channel waveguides, are defined with one-photon absorption laser writing.

Figure 4:
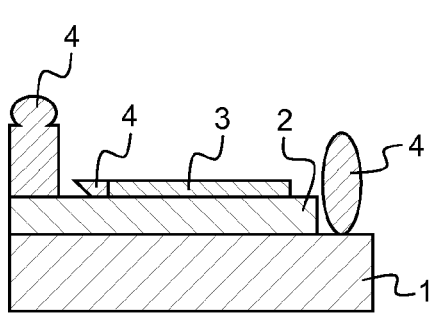
FIG. 4 shows a non limitative example of an embodiment of the invention showing a fourth step of a manufacturing method of a three dimensional photonic device involving polymerization by two-photon absorption.

FIG. 4 shows a non limitative example of an embodiment of the invention showing a fourth step of a manufacturing method of a three dimensional photonic device involving polymerization by two-photon absorption. Unexposed materials, which are unnecessary materials, are removed after laser writing. Micro-optical components get that way their final shape.

Figure 5:
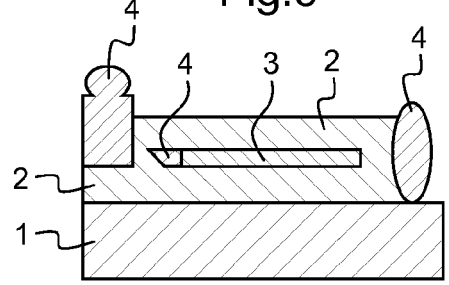
FIG. 5 shows a non limitative example of an embodiment of the invention showing a fifth step of a manufacturing method of a three dimensional photonic device involving polymerization by two-photon absorption.

FIG. 5 shows a non limitative example of an embodiment of the invention showing a fifth step of a manufacturing method of a three dimensional photonic device involving polymerization by two-photon absorption. The remaining cavity is now filled with the cladding material 2. Multiple patterned or not patterned material layers can be stacked by repeating the steps previously described in relation to FIGS. 1 to 5, in order to get at the final product, the three dimensional photonic device integrating several micro-optical components which present an improved relative alignment, thanks to having been polymerized during the same stage of the process flow, by two-photon absorption laser writing for the more complex patterns.

Figure 8:
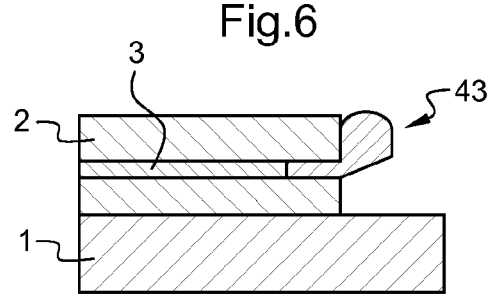
FIG. 8 shows a third non limitative example of an embodiment of the invention showing part of a three dimensional photonic device manufactured by a manufacturing method involving polymerization by two-photon absorption.
Figure 9:
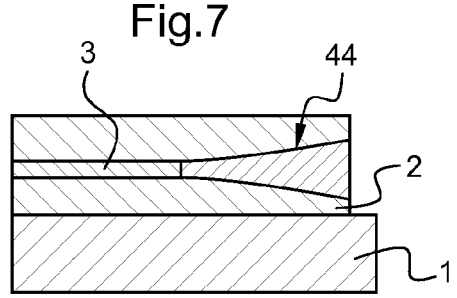
FIG. 9 shows a fourth non limitative example of an embodiment of the invention showing part of a three dimensional photonic device manufactured by a manufacturing method involving polymerization by two-photon absorption.
Figure 10:
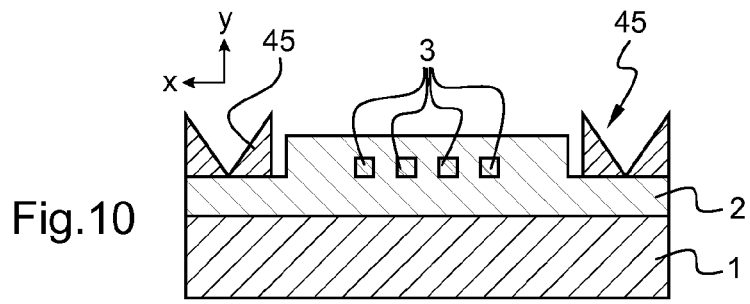
FIG. 10 shows a fifth non limitative example of an embodiment of the invention showing part of a three dimensional photonic device manufactured by a manufacturing method involving polymerization by two-photon absorption.
Figure 11:
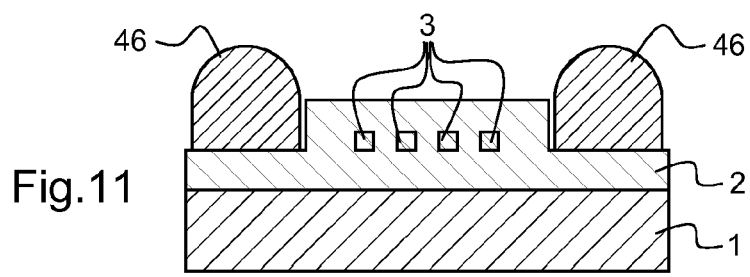
FIG. 11 shows a sixth non limitative example of an embodiment of the invention showing part of a three dimensional photonic device manufactured by a manufacturing method involving polymerization by two-photon absorption.

FIGS. 6, 7, 8 and 9, show schematic profiles of monolithically integrated waveguides and free space micro-optical components, whereas FIGS. 10 and 11 show schematic profiles of monolithically integrated waveguides and micromechanical elements.

Figure 6:
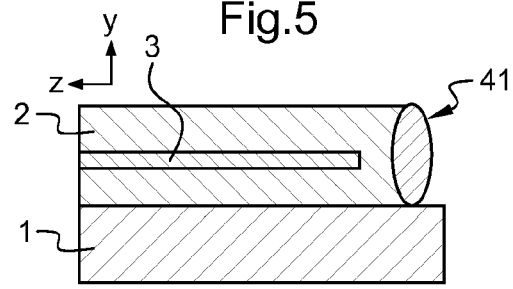
FIG. 6 shows a first non limitative example of an embodiment of the invention showing part of a three dimensional photonic device manufactured by a manufacturing method involving polymerization by two-photon absorption.

FIG. 6 shows a first non limitative example of an embodiment of the invention showing part of a three dimensional photonic device manufactured by a manufacturing method involving polymerization by two-photon absorption. A channel waveguide 3 is spaced apart from a micro-lens 41. The channel waveguide 3 is well aligned with the micro-lens 41.

Figure 7:
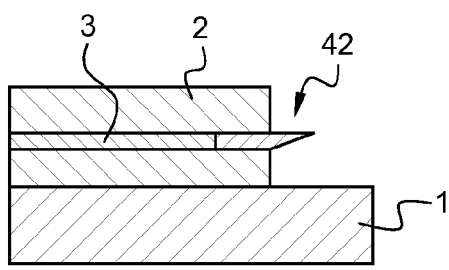
FIG. 7 shows a second non limitative example of an embodiment of the invention showing part of a three dimensional photonic device manufactured by a manufacturing method involving polymerization by two-photon absorption.

FIG. 7 shows a second non limitative example of an embodiment of the invention showing part of a three dimensional photonic device manufactured by a manufacturing method involving polymerization by two-photon absorption. A channel waveguide 3 is extended by a total internal reflection micro-mirror 42. The channel waveguide 3 is well aligned with the micro-mirror 42.

FIG. 8 shows a third non limitative example of an embodiment of the invention showing part of a three dimensional photonic device manufactured by a manufacturing method involving polymerization by two-photon absorption. A channel waveguide 3 is extended by a lensed total internal reflection micro-mirror 43. The channel waveguide 3 is well aligned with the lensed total internal reflection micro-mirror 43.

FIG. 9 shows a fourth non limitative example of an embodiment of the invention showing part of a three dimensional photonic device manufactured by a manufacturing method involving polymerization by two-photon absorption. A channel waveguide 3 is extended by a two dimensional taper 44. The channel waveguide 3 is well aligned with the two dimensional taper 44.

FIG. 10 shows a fifth non limitative example of an embodiment of the invention showing part of a three dimensional photonic device manufactured by a manufacturing method involving polymerization by two-photon absorption. Here, several core waveguides 3 are embedded in a cladding 2. On each side of the core waveguides 3 are located integrated grooves 45. Those integrated grooves 45 are well aligned with the core waveguides 3.

FIG. 11 shows a sixth non limitative example of an embodiment of the invention showing part of a three dimensional photonic device manufactured by a manufacturing method involving polymerization by two-photon absorption. Here, several core waveguides 3 are embedded in a cladding 2. On each side of the core waveguides 3 are located integrated hemispheres 46. Those integrated hemispheres 46 are well aligned with the core waveguides 3.

Figure 12:
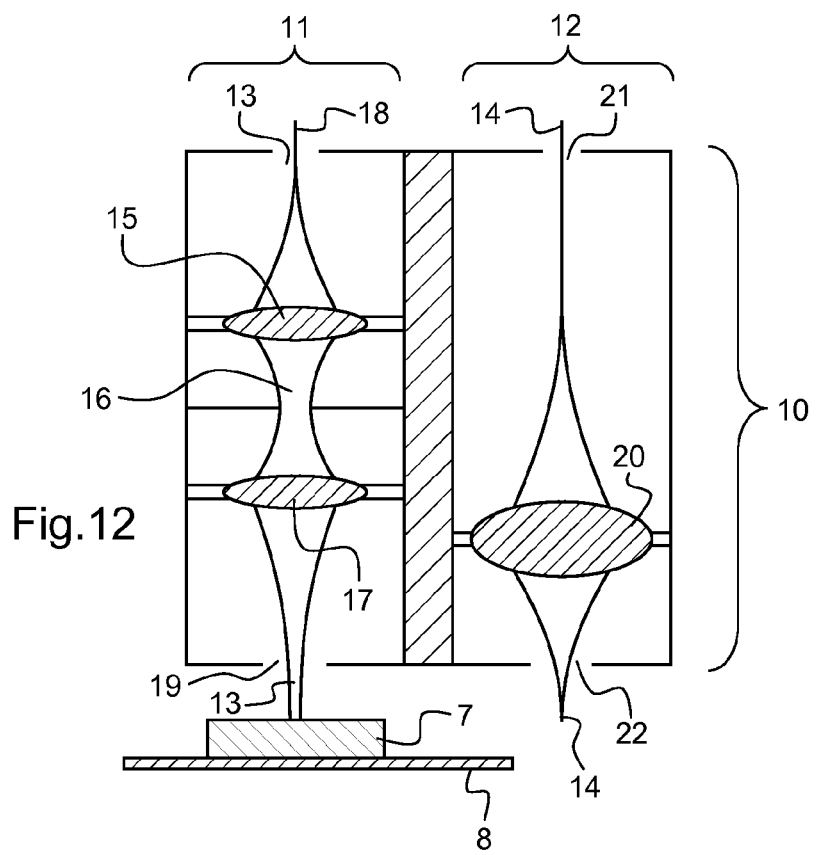
FIG. 12 shows a non limitative example of an embodiment of the invention showing a hybrid laser apparatus fit for performing a manufacturing method involving polymerization by two-photon absorption.

FIG. 12 shows a non limitative example of an embodiment of the invention showing a hybrid laser apparatus fit for performing a manufacturing method involving polymerization by two-photon absorption. The whole hybrid laser writing setup 10 comprises two main exposure systems 11 and 12. Exposure system 11 produces a one-photon absorption laser beam 13. Exposure system 12 produces a two-photon absorption laser beam 14. The laser beam, either the one-photon absorption laser beam 13 or the two-photon absorption laser beam 14, can be concentrated on a sample 7 lying on a stage 8. On FIG. 12, it is the one-photon absorption laser beam 13 which is focused on the sample 7. It is possible to switch from one laser beam to the other, so that it can be the two-photon absorption laser beam 14 which can be on the sample 7. The exposure systems for one-photon absorption and two-photon absorption laser writings are mounted in a way to maintain accurate positioning. Shutters not represented for clarity of FIG. 12, control the timing of the different exposure systems. An embedded height measurement system not represented for clarity of FIG. 12 maintains vertical alignment between elements defined by one-photon and two-photon exposure systems 11 and 12.

Exposure system 11 producing a one-photon absorption laser beam 13 comprises an input 18, a first lens 15, a pinhole 16, a second lens 17 and an output 19. In the exposure system 11, the one-photon absorption laser beam 13 is issued from a laser source not represented for clarity of FIG. 12, enters the input 18, and then successively goes through the first lens 15 where it is focused, the pinhole 16 where it is broadened, the second lens 17 where it is focused again, before exiting through the output 19, ready to polymerize part of a sample 7. The one-photon absorption laser beam 13 light is preferably in the spectral range of the ultraviolet. Moving speed of the one-photon absorption laser beam 13 can be rather high, for example above 100 millimeters per second.

Exposure system 12 producing a two-photon absorption laser beam 14 comprises an input 21, a third lens 20 and an output 22. In the exposure system 12, the two-photon absorption laser beam 14 is issued from a laser source not represented for clarity of FIG. 12, preferably from a pulsed laser source, enters the input 21, and goes through the third lens 20 where it is focused, before exiting through the output 22, ready to polymerize part of a sample 7. The two-photon absorption laser beam 14 light is preferably in the spectral range of the visible and/or of the infrared. The two-photon absorption laser beam 14 is specifically adapted and dedicated to micro-optical components with complex and arbitrary geometries. Resolution can be for example as precise as 80 nanometers.

This multi-photon lithography technique is used for creating small features in a photosensitive material, without the use of complex optical systems or photo-masks. By scanning and properly modulating the laser, a chemical change, which is usually polymerization, occurs at the focal spot of the laser and can be controlled to create an arbitrary three dimensional pattern, either periodic or non-periodic. Since two-photon absorption is a third-order, non linear process which can be several orders of magnitude weaker than linear absorption, quite high intensities can be required. Tightly focused laser beams can provide the needed intensities. A pulsed laser source will be preferred for two-photon absorption since it can deliver high intensity pulses while depositing a relatively low average energy.

The invention has been described with reference to preferred embodiments. However, many variations are possible within the scope of the invention.

The invention claimed is:

1. Method of manufacturing a three dimensional photonic device according to a process flow that includes several manufacturing stages, the method comprising:
    fabricating at least two distinct micro-optical components by direct laser writing involving polymerization by two-photon absorption at a same manufacturing stage of said process flow:
    wherein said at least two distinct micro-optical components;
    are integrated within said three dimensional photonic device;
    have respective optical functions; and
    are aligned with each other such that an optical signal can be transmitted from one of said distinct components to another one of said distinct components; and
    wherein said manufacturing is performed by hybrid direct laser writing comprising:
    a first beam to perform said direct laser writing involving polymerization by two-photon absorption, to build three dimensional components; and
    a second beam, distinct from said first beam, to perform another direct laser writing involving polymerization by one-photon absorption, to build two dimensional components, both said beams being adapted to be used alternatively.

2. Method of manufacturing according to claim 1, wherein at least one of said distinct components comprises a concave shape along a direction of a thickness of said three dimensional photonic device.

3. Method of manufacturing according to claim 1, wherein light of said direct laser writing involving polymerization by two-photon absorption ranges in at least one of the visible and/or the infrared, and wherein light of said direct laser writing involving polymerization by one-photon absorption ranges in the ultraviolet.

4. Method of manufacturing according to claim 1, wherein at least one of said distinct components is a passive waveguide adapted to transmit an optical signal between from or to another of said distinct components.

5. Method of manufacturing according to claim 4, wherein said passive waveguide is adapted to transmit an optical signal between an at least two others of said distinct components.

6. Method of manufacturing according to claim 1, wherein said three dimensional photonic device comprises at least one passive waveguide which is adapted to transmit an optical signal from or to another of said distinct components.

7. Method of manufacturing according to claim 6, wherein said one passive waveguide has been manufactured by mask exposure based photolithography.

8. Method of manufacturing according to claim 7, further comprising the step of:
   removing unexposed materials.

9. Method of manufacturing according to claim 8, wherein said depositing, said direct laser writing and said removing, are performed several times to constitute several corresponding stacks.

10. Method of manufacturing according to claim 1, wherein at least one of said distinct components is a microlens, a mirror, a multiplexer, a coupler, a splitter, a polarization controller, an amplifier, a detector, a pyramid, or a pit.

11. Method of manufacturing according to claim 1, wherein said three dimensional photonic device comprises at least a guided wave micro-optical component.

12. Method of manufacturing according to claim 11, wherein said three dimensional photonic device comprises at least a free space micro-optical component.

13. Method of manufacturing according to claim 12, wherein said three dimensional photonic device comprises at least a micromechanical structure.

14. Method of manufacturing according to claim 1, further comprising the step of:
   depositing at least one film on a substrate.

15. A computer program product comprising a computer readable medium, having thereon a computer program comprising program instructions, the computer program being loadable into a data-processing unit and adapted to cause execution of the method according to claim 1.

16. Method of manufacturing a three dimensional photonic device according to a process flow that includes several manufacturing stages, the method comprising:
   direct laser writing involving polymerization by two-photon absorption;
   alternative direct laser writing involving polymerization by one-photon absorption; and
   fabricating at least two distinct micro-optical components by direct laser writing involving polymerization by two-photon absorption at a same manufacturing stage of said process flow:
   wherein said at least two distinct micro-optical components are integrated within said three dimensional photonic device, have respective optical functions, and are aligned with each other such that an optical signal can be transmitted from one of said distinct components to another one of said distinct components; and
   wherein said three dimensional photonic device comprises at least a free space micro-optical component and at least a free space micro-optical component.

17. Method of manufacturing at least two distinct micro-optical components by direct laser writing comprising:
   polymerizing by two-photon absorption;
   integrating a three dimensional photonic device;
   presenting a concave shape along the direction (y) of the thickness of said three dimensional photonic device; and
   aligning said at least two-distinct micro-optical components such that an optical signal can be transmitted from one of said distinct components to another one of said distinct components;
   wherein said at least two distinct micro-optical components have respective optical functions;
   wherein said at least two distinct micro-optical components are manufactured at a same stage of a process flow of manufacturing said three dimensional photonic device; and
   wherein said manufacturing is performed by hybrid direct laser writing comprising;
   a first beam to perform said direct laser writing involving polymerization by two-photon absorption to build three dimensional components; and
   a second beam, distinct from said first beam, to perform another direct laser writing involving polymerization by one-photon absorption to build two dimensional components, both said beams being adapted to be used alternatively.

* * * * *